United States Patent
Braun et al.

(10) Patent No.: US 7,360,156 B1
(45) Date of Patent: Apr. 15, 2008

(54) METHOD AND SYSTEM FOR PERFORMING ACTIONS ON CONTENT IN A REGION WITHIN A FREE FORM TWO-DIMENSIONAL WORKSPACE

(75) Inventors: Owen C. Braun, Seattle, WA (US); Christopher H. Pratley, Seattle, WA (US); Stuart J. Stuple, Carnation, WA (US); Alex J. Simmons, Seattle, WA (US); Timothy D. Sellers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 10/268,000

(22) Filed: Oct. 9, 2002

(51) Int. Cl.
 *G06F 15/00* (2006.01)
 *G06F 3/048* (2006.01)
 *G06F 15/167* (2006.01)
(52) U.S. Cl. .............. 715/530; 715/531; 715/764; 709/213
(58) Field of Classification Search ........... 715/530, 715/764, 765, 766, 767, 501.1, 531
 See application file for complete search history.

(56) References Cited

U.S. PATENT DOCUMENTS

| | | | |
|---|---|---|---|
| 5,608,850 A * | 3/1997 | Robertson | 345/427 |
| 5,689,628 A * | 11/1997 | Robertson | 345/427 |
| 5,748,185 A * | 5/1998 | Stephan et al. | 345/173 |
| 5,784,061 A * | 7/1998 | Moran et al. | 715/863 |
| 5,898,434 A * | 4/1999 | Small et al. | 715/810 |
| 5,914,718 A * | 6/1999 | Chiu et al. | 715/863 |
| 5,923,323 A * | 7/1999 | Chiu et al. | 715/767 |
| 5,956,030 A * | 9/1999 | Conrad et al. | 715/769 |
| 6,023,275 A * | 2/2000 | Horvitz et al. | 715/700 |
| 6,065,012 A * | 5/2000 | Balsara et al. | 707/102 |
| 6,157,935 A * | 12/2000 | Tran et al. | 715/503 |
| 6,239,798 B1 * | 5/2001 | Ludolph et al. | 715/788 |
| 6,594,390 B2 * | 7/2003 | Frink et al. | 382/187 |
| 6,603,493 B1 * | 8/2003 | Lovell et al. | 715/800 |
| 6,606,649 B1 * | 8/2003 | Schwitters et al. | 709/206 |
| 6,671,855 B1 * | 12/2003 | Hayashi et al. | 715/530 |
| 6,690,364 B1 * | 2/2004 | Webb | 345/179 |
| 6,950,990 B2 * | 9/2005 | Rajarajan et al. | 715/736 |

(Continued)

OTHER PUBLICATIONS

Anonymous, "Being "Smart" with Smart Tags in Office XP", Create for Mississippi, XP002325732, Aug. 2001, pp. 1-7.*

(Continued)

*Primary Examiner*—William Bashore
*Assistant Examiner*—MaiKhanh Nguyen
(74) *Attorney, Agent, or Firm*—Merchant & Gould

(57) ABSTRACT

A method and system are provided for performing actions on content in a region within a free form two-dimensional workspace. In a computer software application, a region is defined within the workspace, an action is associated with the region, content is received within the region, and an action is performed on the content in the region. The region may be defined by generating an outline object to define a region within the workspace. An action may be associated with the region by selecting an action from a list of actions to associate with the region. The actions performed may be handwriting recognition, adding data to a contacts list, adding data to a task list, and identifying a recognizer for the content. The actions may also include editing data entered in a region.

14 Claims, 7 Drawing Sheets

U.S. PATENT DOCUMENTS

| | | | |
|---|---|---|---|
| 6,996,778 B2* | 2/2006 | Rajarajan et al. | 715/734 |
| 7,002,560 B2* | 2/2006 | Graham | 345/179 |
| 2002/0147709 A1* | 10/2002 | Rajarajan et al. | 707/3 |
| 2002/0149601 A1* | 10/2002 | Rajarajan et al. | 345/619 |
| 2002/0149623 A1* | 10/2002 | West et al. | 345/765 |
| 2002/0156865 A1* | 10/2002 | Rajarajan et al. | 709/217 |
| 2002/0180776 A1* | 12/2002 | Fishman | 345/733 |
| 2003/0004830 A1* | 1/2003 | Frederick | 705/26 |
| 2003/0088536 A1* | 5/2003 | Behnia | 707/1 |
| 2003/0125929 A1* | 7/2003 | Bergstraesser et al. | 704/9 |
| 2003/0226113 A1* | 12/2003 | Altman et al. | 715/520 |
| 2004/0030878 A1* | 2/2004 | Hunt et al. | 713/1 |
| 2004/0239700 A1* | 12/2004 | Baschy | 345/781 |

OTHER PUBLICATIONS

Anonymous, "Smart Tags: Dumb Technology?", Webreference.com, Aug. 2001, pp. 1-3.*

H. Shiozawa et al., "Perspective Layered Workspace for Collabrative Work," IEEE, Sep. 1999, pp. 80-85.*

E. Schroeter et al., "An Application Interface With Multiple Workspaces: The Context Switcher," IEEE, Nov. 1996, pp. 318-319.*

B. Dorohonceanu et al., "A Novel User Interface for Group Collaboration," IEEE, Jan. 2000, pp. 1-10.*

* cited by examiner

METHOD AND SYSTEM FOR PERFORMING ACTIONS ON CONTENT IN A REGION WITHIN A FREE FORM TWO-DIMENSIONAL WORKSPACE

FIELD OF THE INVENTION

The present invention relates to a method and system for performing actions on content in a region within a free form two-dimensional workspace.

BACKGROUND OF THE INVENTION

Computer software applications allow users to create a variety of document types. For example, word processing applications are used for note taking, creating letters, articles, books, memoranda, and the like. In recent years, use of such computer software applications has been expanded to include traditional desktop computers, laptop computers, and a variety of hand held electronic devices, including hand held personal computers, and personal digital assistants. Moreover, in recent years, a variety of data input methods have been created, including keyboard entry, voice recognition entry, and handwriting recognition entry. In a typical handwriting recognition entry system, a user is allowed to handwrite content directly onto the display screen of her computing device as a method of data entry.

Typical software application programs, as described above, present on the display screen of the user's computing device a workspace in which the user may input or manipulate content. Unfortunately, in many of these applications, the user is confined to predefined areas of a page or workspace to input data which reduces the free form nature of the user experience. When users handwrite notes or draw images on a sheet of paper using a pen or pencil, users naturally use the entire sheet of paper and often write text or draw images without any particular document structure.

Other software applications developed in recent years allow users to link content input in the workspace with other desktop applications and/or web-based applications. Illustrative functions, features, and operations may include automatically addressing an e-mail message, performing a look up in a cooperating database, providing a hyperlink to one or more Internet web pages and providing enhanced content. One current scheme involves utilizing an application program module to pass a string of text (e.g., a paragraph) entered into an electronic document to a recognizer. The recognizer parses the string for known grammars. Each recognized string is then labeled with the title of a "smart tag" category to which it belongs. For example, when a user types the string "Bob Smith" which is known to the recognizer as a proper name, the recognizer associates the smart tag labeled "name" with the string.

Once a smart tag has been associated with a string, the application program module may display to the user a selection of actions associated with the smart tag. For example, the smart tag entitled "name" may be associated with the action "Add name to contacts folder." However, current schemes are limited in that they require a user to take action to perform functions on tagged data. Moreover, current schemes are further limited in that they are unable to recognize and associate actions with non-string data (e.g., images, photos, drawings, and other insertable objects) which may be in a document.

Therefore, there is a need in the art for a method and system for utilizing regions in a free form workspace which allows a user to input various types of content without regard to any type of document structure. There is further a need for a method and system of performing actions on content entered into the workspace regardless of the type of content inputted and without the need for user action.

It is with respect to these noted considerations that the present invention has been made.

SUMMARY OF THE INVENTION

The present invention provides a method and system for performing actions on content in a region within a free form two-dimensional workspace. In a computer software application, a region is defined within the workspace, an action is associated with the region, content is received within the region, and an action is performed on the content in the region. The region may be defined by generating an outline object to define a region within the workspace. An action may be associated with the region by selecting an action from a list of actions to associate with the region. The actions performed may be handwriting recognition, adding data to a contacts list, adding data to a task list, identifying a recognizer for the content, or other types of actions. The actions may also include editing data entered in a region.

A system for performing actions on content in a region within a free form two-dimensional workspace includes an application program for opening the workspace, defining the region in the workspace, associating an action with the region, and receiving the content within the region. The system also includes an action plug-in, in communication with the application program, for performing the action on the content in the region. The system may further include an identifier in communication with the application program and the action plug-in for identifying the type of content in the region. The content in the region may be contacts list data or task list data used in an information management program. The system may further include a recognizer, in communication with the application program for recognizing the content in the region.

These and other features, advantages, and aspects of the present invention may be more clearly understood and appreciated from a review of the following detailed description of the disclosed embodiments and by references to the appended drawings and claims.

DETAILED DESCRIPTION

The following description of an embodiment of the present invention is made with reference to the above-described drawings. The present invention is directed to a method and system for performing actions on content in a region within a free form two-dimensional workspace.

Operating Environment

Figure 1:
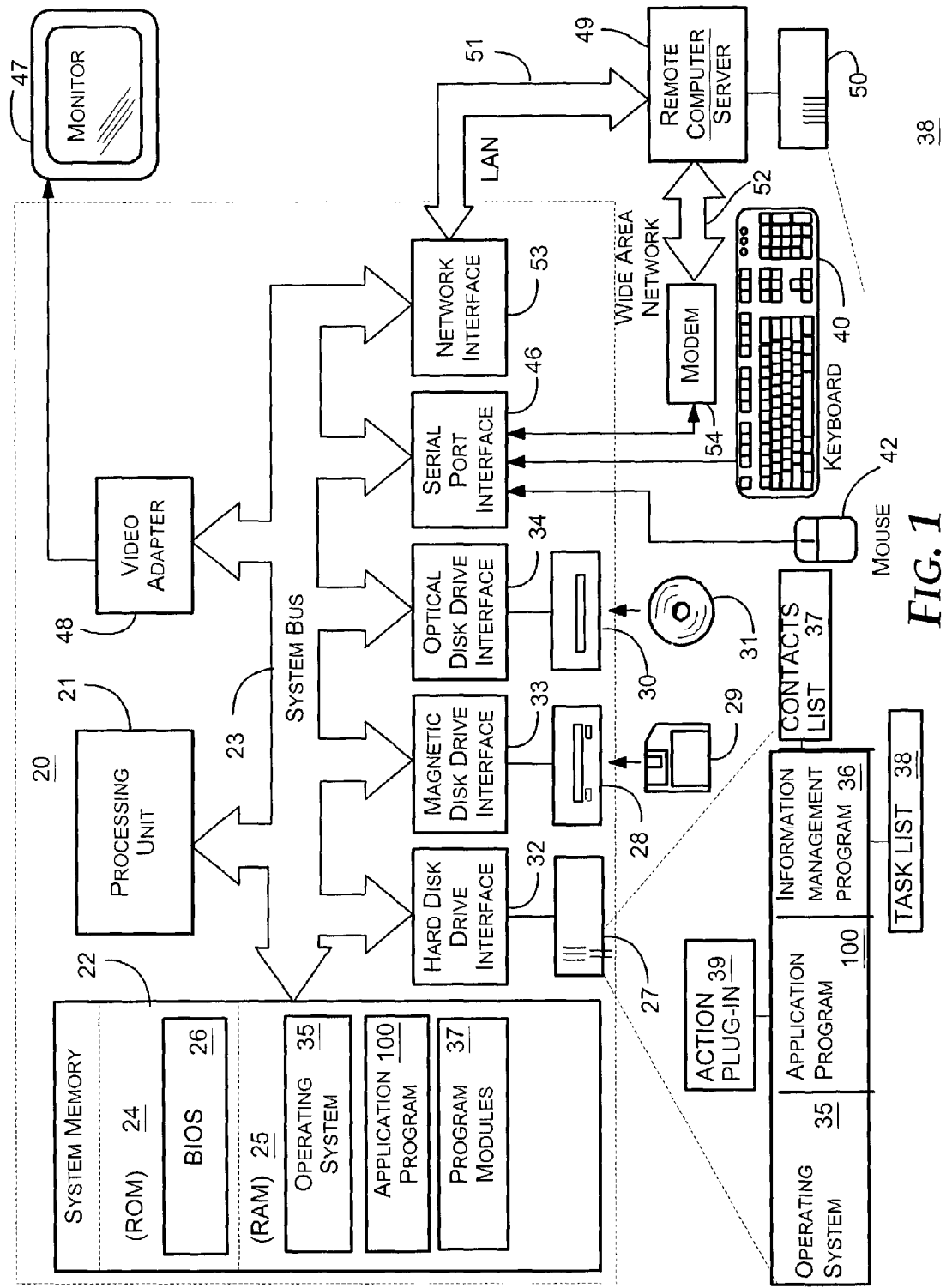
FIG. 1 is a block diagram of a computer and associated peripheral and networked devices that provide an illustrative operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an illustrative system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the illustrative operating environment.

A number of program modules may be stored in the drives and RAM 25, including an operating system 35 and one or more application programs 100, such as an information management program 36 for managing data in a contacts list 37 and a task list 38. Such data may include names, addresses, telephone numbers, e-mail addresses, and dates. An illustrative information management program is the "OUTLOOK" ® program included in the "OFFICE" program suite, both marketed by MICROSOFT CORPORATION of Redmond, Wash. Application program 100 may also include various plug-in modules such as the action plug-in 39 for performing actions on data entered into the application program 100. Action plug-in 39 will be discussed in more detail with reference to FIG. 2, below. It will be appreciated that the program modules shown are illustrative and other program modules may also be stored in the drives and RAM 25 of the personal computer 20.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used.

Figure 2:
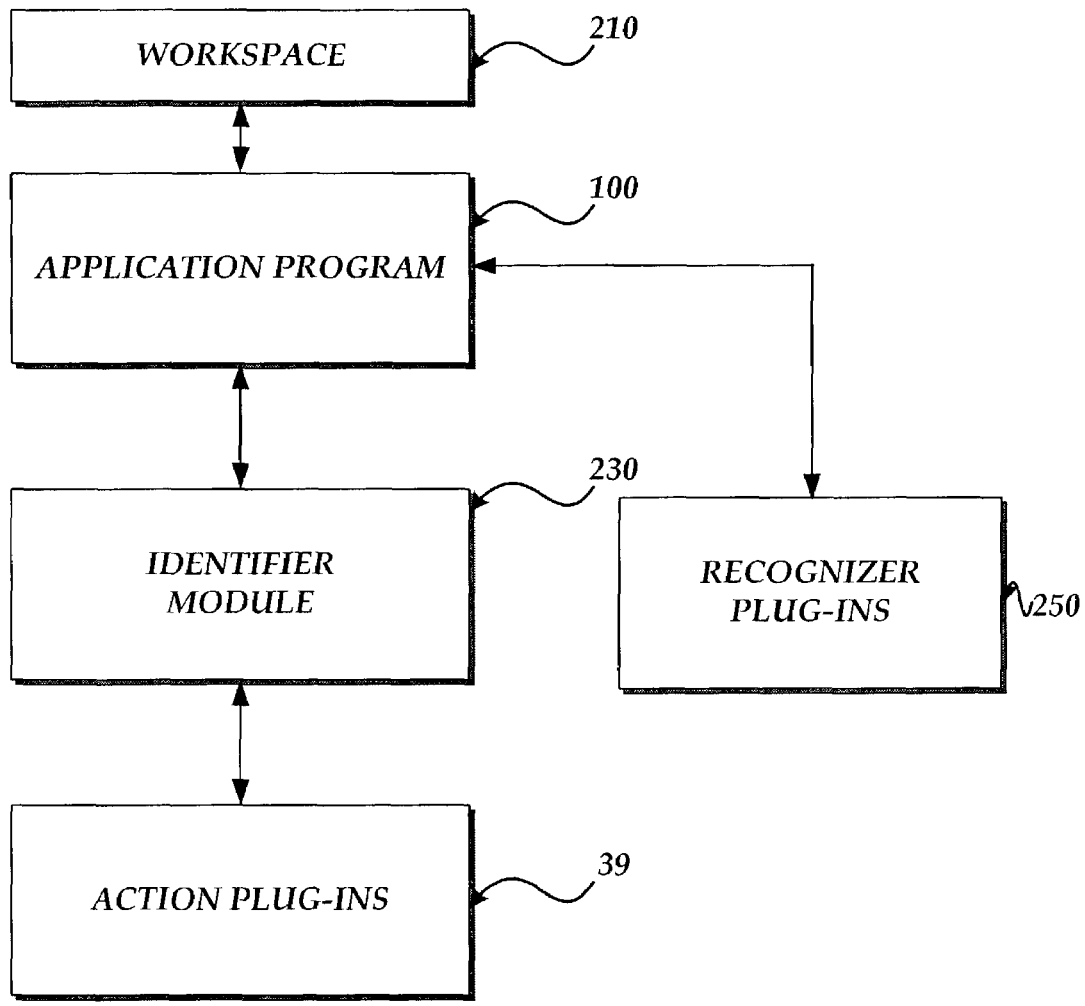
FIG. 2 is a block diagram showing an illustrative architecture for use in conjunction with various embodiments of the present invention.

FIG. 2 is a block diagram illustrating an illustrative software architecture 200 for use in conjunction with various embodiments of the present invention. The architecture includes an application program 100, which may be a word processor program, an information management program, or other type of program. The application program 100 is capable of generating a workspace 210 for display on the monitor 47 that allows a user to enter data into the personal computer 20. The application program 100 communicates with identifier 230 which identifies the type of content entered by a user in an electronic document created by the application program. The identifier 230 also communicates with one or more action plug-ins 39 for performing actions based on the type of content identified by the identifier 230. An action is a function applied to a typed string of text or other content such as handwriting, drawings, or images.

In one embodiment, the action plug-ins 39 are Automation Servers. Automation Servers are well-known software components which are assembled into programs or add functionality to existing programs running on the Microsoft WINDOWS® operating system. Automation Servers may be written in a variety of computing languages and may be un-plugged from a program at run time without having to recompile the program. In another embodiment, the identifier 230 and the action plug-ins 39 are integrated into the application program 100 as a single executable (EXE) software file for creating and editing an electronic document. It will be appreciated that the above-described software components are illustrative and other means implementing the action plug-ins 39 may be used.

In one embodiment, the identifier 230 may also communicate with a recognizer dynamic link library (DLL) 250 to provide smart tag functionality to content in an electronic document created by the application program 100. The identifier 230 determines the appropriate recognizer DLL based on the type of content identified in the workspace 210 generated by the application program 100. For example, if the identifier 130 identifies content in the application program as a name, the identifier will communicate with a name recognizer DLL to provide smart tag functionality for the identified content. In one embodiment, the recognizer DLL 250 may be a separate software module which is called on by the application program 100 to provide smart tag functionality to identify content.

Figure 3:
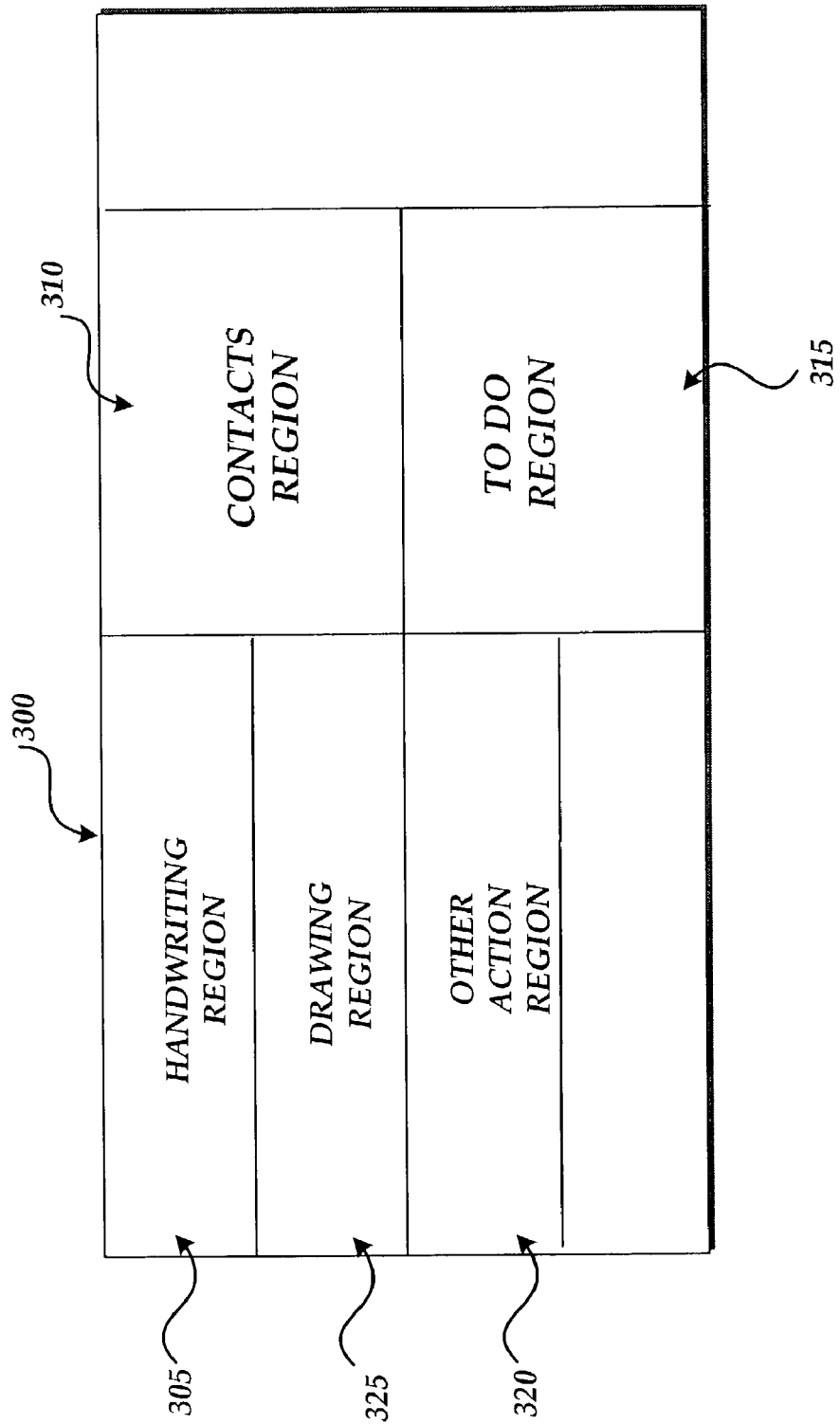
FIG. 3 illustrates a computer display screen provided by the software application for receiving content in separate regions of the workspace according to an embodiment of the present invention.

FIG. 3 illustrates a computer display screen provided by the software application 100 for receiving content in separate regions of the workspace 210 according to an embodiment of the present invention. The workspace 210 is shown as a free form two-dimensional writing surface. That is, a user may use the workspace 210 to enter content in a similar fashion as the user would use a sheet of paper on which the user is taking notes. Thus, the user is not confined to any particular area of the workspace to enter content. In one embodiment, the workspace 210 may also be expanded dynamically in both horizontal and vertical directions as content is added.

The workspace 210 includes regions 305, 310, 315, 320, and 325 for receiving content entered by a user and for performing various actions on the content. The specific action performed is based on actions associated with the region in which the content is entered. For example, region 305 may be associated with an action for converting handwriting to text, regions 310 and 315 may be associated with actions for transferring contact and to do list information to contact and task list modules in a software program, such as an information management program, region 320 may be associated with an action for performing smart tag functionality, and region 325 may be associated with an action for keeping content as a drawing. In the above-described example, the regions are not limited to associations with the actions listed above. In fact, any action, including those other than those listed above may be associated to any region in the workspace. The regions described above may be pre-defined to perform specific actions in the workspace 210 or defined by the user in the application program 100. Each of the regions may also be dynamic. That is, the size of regions may expand as additional content is entered. An illustrative routine of defining regions and assigning actions is described below with reference to FIG. 4.

Figure 4:
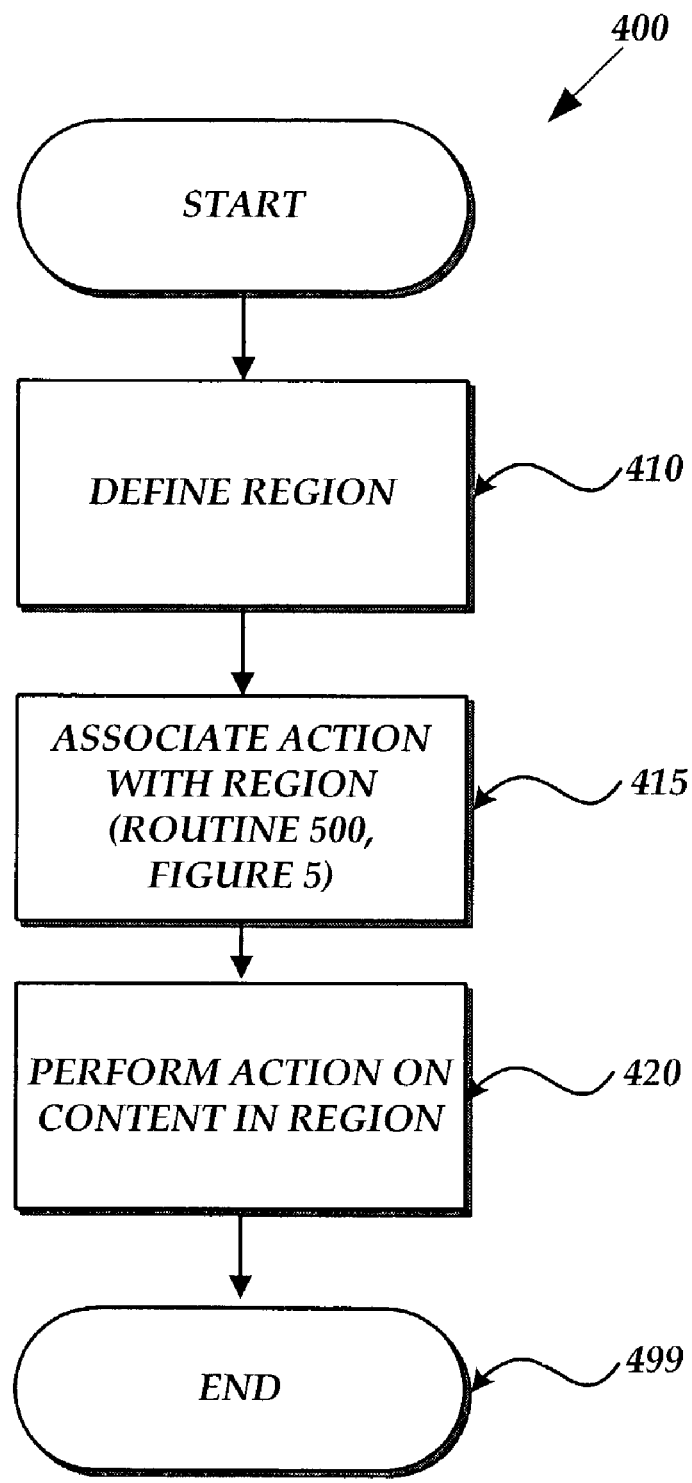
FIG. 4 is a flow chart showing steps performed by an illustrative routine of defining a region for performing an action on content in a workspace.
Figure 7:
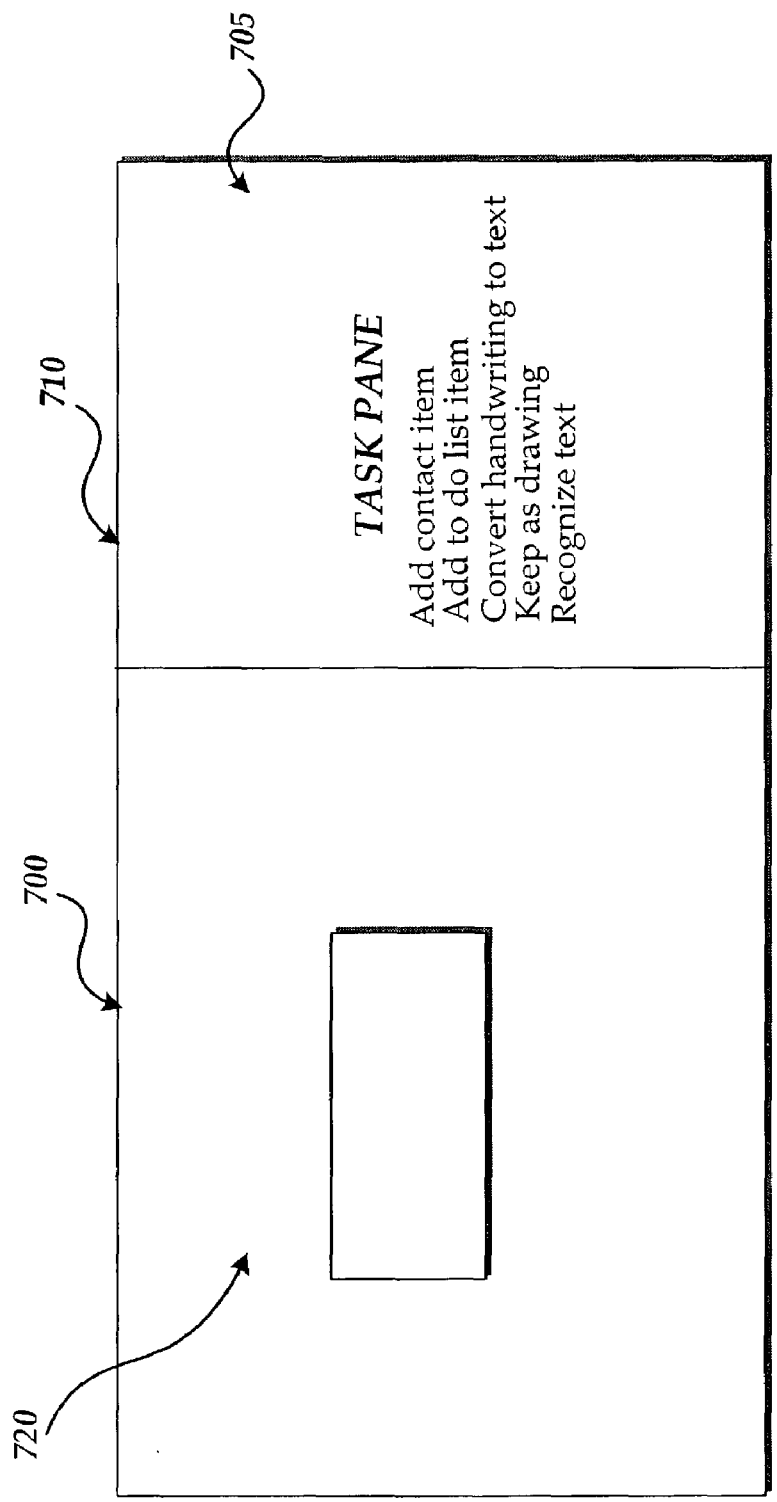
FIG. 7 illustrates a computer display screen showing a workspace for defining a region and associating an action according to an embodiment of the present invention.

FIG. 4 is a flow chart showing an illustrative routine 400 for defining a region for performing an action on content in the workspace 210. For purposes of description, FIG. 4 is described with reference to FIGS. 1 and 7. FIG. 7 illustrates a computer display screen showing a workspace 700 for defining a region and associating an action according to an embodiment of the present invention. The workspace 700 includes a task pane 705 for displaying a list of actions for the user to select and associate with the workspace, and an outline object 720 for defining a region.

The routine 400 begins at block 410 where a region is defined within the workspace 210. A region is defined by generating an outline object 720 in the workspace 210. Outline object 720 may be created using a user interface integrated within the application program 100. The outline object 720 may be sized in the user interface using outline object handles (not shown) to define the region. The region may be predefined by the application program 100 or defined by a user.

At block 415, an action to be performed on content entered into the defined region in the workspace is associated with the region. As described above in FIG. 3, various actions may be associated with a region for performing a variety of tasks (such as handwriting recognition, transferring data to a information management program, etc.). An illustrative routine 500 for associating an action with a region will be described in more detail with respect to FIG. 5 below. As briefly described above, a region may be predefined by the application program 100 or defined by a user of the application program. As such, if the region is predefined, steps 410 and 415 would have already been performed when a user opens the application program 100. That is, a defined region with an associated action would be displayed to the user. If the region is user-defined, the user would perform the actions described at blocks 410 and 415 using a user interface provided by the application program 100. At block 420, the selected action on content entered in the defined region is performed. The routine 400 then ends at block 499.

Figure 5:
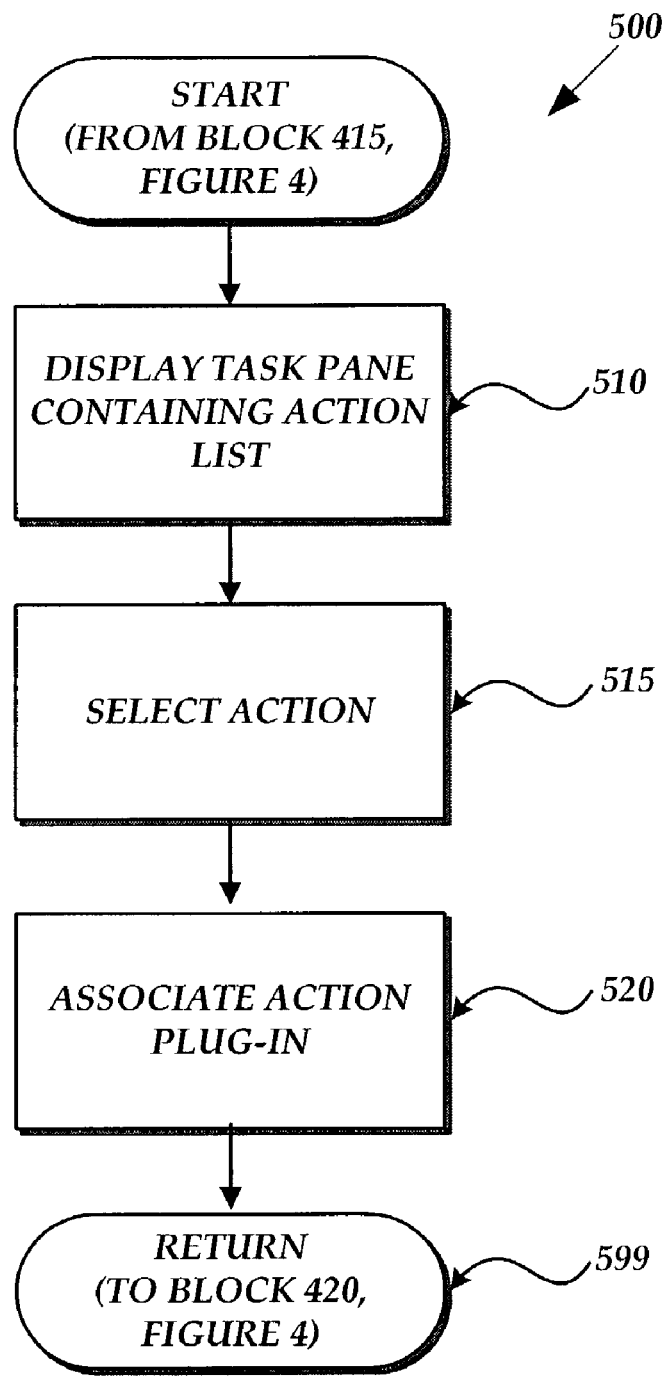
FIG. 5 is a flow chart showing steps performed by an illustrative routine of associating an action with the region defined in FIG. 4 according to an embodiment of the present invention.

Referring now to FIG. 5, an illustrative routine 500 will be described for associating an action with the region defined at block 415 of FIG. 4. The routine 500 beings at block 510 where the application program 100 displays a task pane 705 in the user interface for containing a list of actions that may be assigned to the region. In one embodiment, the list of actions displayed in task pane 705 may include handwriting recognition, performing smart tag functionality, or transferring information to a task list or contacts list in a cooperating software application such as a personal information management program. Other types of actions may also be made available through the task pane 705. After displaying the task pane 705, an action may be selected. After an action is selected, the application program 100 associates an action plug-in 39 for performing the action. At block 599, the routine 500 returns to block 420.

Figure 6:
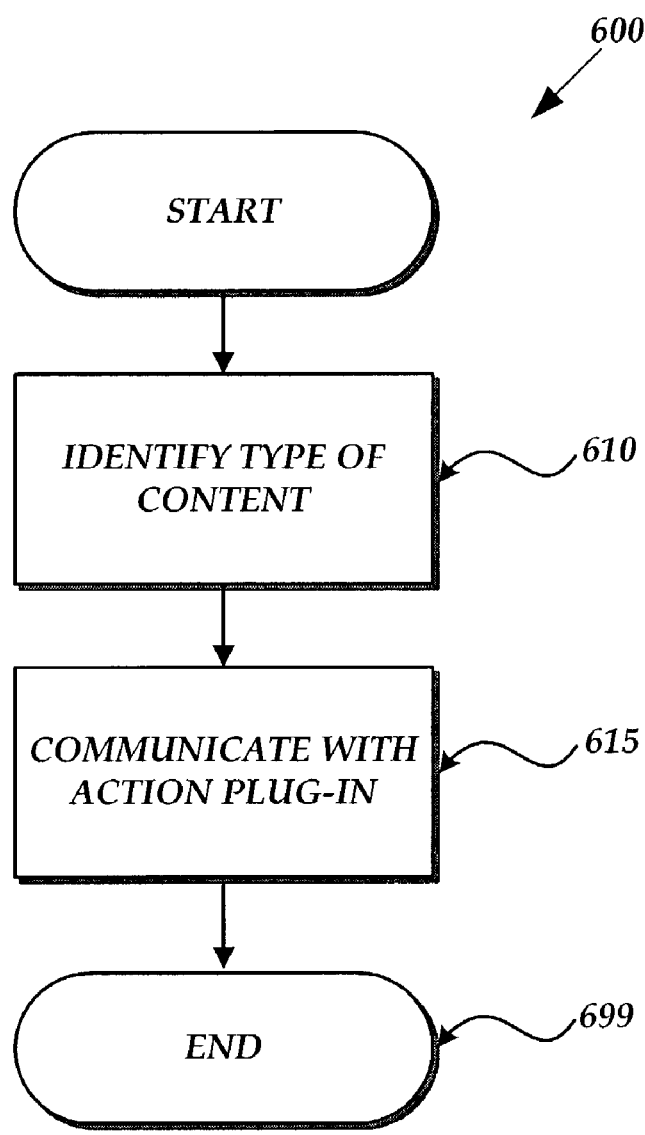
FIG. 6 is a flow chart showing steps performed by an illustrative routine of performing actions on content entered by a user in a region according to an embodiment of the present invention.

FIG. 6 is a flow chart illustrating steps performed by an illustrative routine 600 for performing actions on content entered by a user in a region. Referring now to FIG. 6, the routine 600 begins at block 610 where the identifier module 230 in the software application 100, identifies the type of content in the region. As described above, the region may be defined to receive a variety of content including handwriting input, contacts information, to do list information, text strings, and drawings. The input method in use by the user may include keyboard entry or handwriting recognition entry. At block 615, after the identifier 230 has identified the type of content, it communicates with the appropriate action plug-in 39 to perform the action associated with the region. The routine 600 then ends at block 699.

As one example as to how the software components provided herein may be utilized, a user using the workspace for note taking may write (e.g., using a pen input) "Bill Rogers, marketing meeting—Nov. 1, 2002" in the To Do list region 315, indicating that the user has a marketing meeting with someone named Bill Rogers on Nov. 1, 2002. The user may also write contact information about Bill Rogers in Contacts Region 310 such as a name and an e-mail address. In this example, the pen input would be converted to text and the identifier module 230 would identify the e-mail address as contact information in the Contacts region and the marketing meeting as a To Do list item in the To Do list region.

The action plug-in 39 would then communicate the entered content to another computer software application such as an information management program. As discussed briefly above, after identifying content in a region, identifier 230 communicates with one or more action plug-ins 40 for performing the action associated with the region. Continuing with the previous example, an action plug-in 39 would transfer the name and e-mail address of Bill Rogers to corresponding fields in the contacts module of the information management program. This may be accomplished using scripts or other types of inter-application automation technologies. Another action plug-in 39 would transfer the item "marketing meeting—Nov. 1, 2002" to the task list module in the information management program.

In one embodiment, the action plug-in 39 may also be used to edit information previously transferred from a region to the information management program. For example, if the user while note taking enters a person's last name in the Contacts region after the person's first name has already been transferred, the last name will be transferred to the "Name" field in the contacts module of the information management program. Similarly, if the user changes information in a region, such as changing a date for a meeting entered in the To Do List region, the date would also changed for the corresponding task list item previously created in the information management program.

It will be apparent to those skilled in the art of the various modifications or variations may be made in the present invention without departing from the scope or spirit of the invention. Other embodiments of the invention will be apparent to those skilled in the art from consideration of the specification and practice of the invention disclosed herein.

We claim:

1. In a system for creating and editing an electronic workspace, a computer-implemented method of performing actions on content in a region within a free form two-dimensional workspace, comprising the steps of:
   defining the region within the free form two-dimensional workspace by generating a user defined outline object, wherein defining the region within the workspace comprises defining a dynamic region in the workspace;
   displaying a task pane in the workspace having a list of actions to associate with the region;
   receiving a selection of an action from the list of actions;
   associating the selected action with the region;
   receiving content within the region, wherein receiving content within the region comprises receiving handwriting and wherein performing the action on the content comprises converting the handwriting to text, and wherein the size of the region dynamically expands in both a horizontal direction and a vertical direction as the content is received and as additional content is entered;
   identifying a content type for the content within the region; and
   performing the action on the content, wherein performing the action comprises performing an automated function with respect to the content received within the region, the automated function comprising transferring the content from the region, the region defined using a first application program, to a second application program, the second application program comprising at least one of the following: a contacts module and a task list module,
   wherein performing the action further comprises:
      adding the text to a contacts list in the second application program;
         wherein adding the text to the contacts list comprises:
            identifying the text; and
            adding the text to a field in the contacts list based on the identified text,
      recognizing the text with a smart tag recognizer dynamic link library, and
      editing the text in the contacts list in the second application program by editing the text in the region defined using the first application program.

2. The method of claim 1, wherein defining the region comprises generating an outline object in the workspace and using at least one handle for sizing the outline object to define the region.

3. The method of claim 1, wherein receiving content within the region comprises receiving a drawing within the region.

4. The method of claim 1, wherein performing the action further comprises adding the text to a task list in the second application program.

5. The method of claim 4, wherein adding the text to a task list comprises:
   identifying the text; and
   adding the text to a field in the task list based on the identified data.

6. The method of claim 4, wherein performing the action further comprises editing the text in the task list in the second application program by editing the text in the region defined using the first application program.

7. A computer-readable medium containing instructions which when executed by a computer perform a method of performing actions on content in a region within a free form two-dimensional workspace, comprising the steps of:
   defining the region within the free form two-dimensional workspace by generating a user defined outline object, wherein defining the region within the workspace comprises defining a dynamic region in the workspace;
   displaying a task pane in the workspace having a list of actions to associate with the region;
   receiving a selection of an action from the list of actions;
   associating the selected action with the region;
   receiving content within the region, wherein receiving content within the region comprises receiving handwriting and wherein performing the action on the content comprises converting the handwriting to text, and wherein the size of the region dynamically expands in both a horizontal direction and a vertical direction as the content is received and as additional content is entered;
   identifying a content type for the content within the region; and
   performing the action on the content, wherein performing the action comprises performing an automated function with respect to the content received within the region, the automated function comprising transferring the content from the region, the region defined using a first application program, to a second application program, the second application program comprising at least one of the following: a contacts module and a task list module, wherein performing the action further comprises:
adding the text to a contacts list in the second application program;
wherein adding the text to the contacts list comprises:
identifying the text; and
adding the text to a field in the contacts list based on the identified text,
recognizing the text with a smart tag recognizer dynamic link library; and
editing the text in the contacts list in the second application program by editing the text in the region defined using the first application program.

8. The computer-readable medium of claim 7, wherein defining the region comprises generating an outline object in a user-defined area of the workspace and using at least one handle for sizing the outline object to define the region.

9. The computer-readable medium of claim 7, wherein performing the action further comprises adding the text to a task list in the second application program.

10. The computer-readable medium of claim 9, wherein adding the text to a task list comprises:
identifying the text; and
adding the text to a field in the task list based on the identified data.

11. The computer-readable medium of claim 9, wherein performing the action further comprises editing the text in the task list in the second application program by editing the text in the region defined using the first application program.

12. A computer system for performing actions on content in a region within a free form two-dimensional workspace, the computer system comprising:
a processor;
a memory connected to the processor;
an application program, the application program when executed by the computer system perform:
opening the free form two-dimensional workspace;
defining the region within the free form two-dimensional workspace by generating a user defined outline object, wherein defining the region within the workspace comprises defining a dynamic region in the workspace;
displaying a task pane in the workspace having a list of actions to associate with the region;
receiving a selection of an action from the list of actions;
associating the selected action with the region; and
receiving content within the region, wherein receiving content within the region comprises receiving handwriting and wherein performing the action on the content comprises converting the handwriting to text, and wherein the size of the region dynamically expands in both a horizontal direction and a vertical direction as the content is received and as additional content is entered;
an identifier, in communication with the application program, for automatically identifying the type of the content received within the region;
an action plug-in, in communication with the application program and the identifier, for performing the action based on the type of the content identified by the identifier in the region, wherein the action is an automated function applied to the content received within the region, the automated function comprising transferring the content from the region, the region defined using a first application program, to a second application program, the second application program comprising at least one of the following: a contacts module and a task list module, and
a smart tag recognizer dynamic link library, in communication with the application program for recognizing the content in the region,
wherein performing the action further comprises:
adding the text to a contacts list in the second application program;
wherein adding the text to the contacts list comprises:
identifying the text; and
adding the text to a field in the contacts list based on the identified text
recognizing the text with the smart tag recognizer dynamic link library, and
editing the text in the contacts list in the second application program by editing the text in the region defined using the first application program.

13. The system of claim 12, wherein the content is contacts list data.

14. The system of claim 12, wherein the content is task list data.

* * * * *

UNITED STATES PATENT AND TRADEMARK OFFICE
CERTIFICATE OF CORRECTION

| | | |
|---|---|---|
| PATENT NO. | : 7,360,156 B1 | Page 1 of 1 |
| APPLICATION NO. | : 10/268000 | |
| DATED | : April 15, 2008 | |
| INVENTOR(S) | : Owen C. Braun et al. | |

It is certified that error appears in the above-identified patent and that said Letters Patent is hereby corrected as shown below:

In column 10, line 35, in Claim 12, after "text" insert -- , --.

Signed and Sealed this
Twenty-second Day of February, 2011

David J. Kappos
*Director of the United States Patent and Trademark Office*